United States Patent
Davidson

(12) 
(10) Patent No.: US 6,838,997 B1
(45) Date of Patent: Jan. 4, 2005

(54) FASTENERLESS CONNECTION FOR OUTPUT DEVICE

(75) Inventor: Curtis R. Davidson, Oswego, IL (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 09/553,578

(22) Filed: Apr. 20, 2000

Related U.S. Application Data

(63) Continuation-in-part of application No. 08/953,122, filed on Oct. 17, 1997, now Pat. No. 6,133,843.

(51) Int. Cl.$^7$ .............................................. G08B 23/00
(52) U.S. Cl. ............................... 340/693.9; 340/691.1; 174/53; 174/58; 174/66; 361/600
(58) Field of Search ........................... 340/691.1, 693.9; 174/53, 58, 54, 66, 55, 61, 67; 362/147, 368, 374; 439/535, 533, 536, 537, 538, 540.1, 541, 541.5, 544, 550, 552; 361/600, 728, 731, 732

(56) References Cited

U.S. PATENT DOCUMENTS

| | | | | |
|---|---|---|---|---|
| 4,037,223 A | * | 7/1977 | Tucci et al. | 340/571 |
| 4,315,594 A | | 2/1982 | Niederost | 340/693.11 |
| 4,649,230 A | * | 3/1987 | Nielsen | 174/65 R |
| 5,135,411 A | | 8/1992 | Wiley et al. | 439/535 |
| 5,180,886 A | * | 1/1993 | Dierenbach et al. | 174/66 |
| 5,223,673 A | * | 6/1993 | Mason | 174/53 |
| 5,594,208 A | * | 1/1997 | Cancellieri et al. | 174/58 |
| 5,598,139 A | | 1/1997 | Karim et al. | 340/286.11 |
| 5,602,522 A | | 2/1997 | Pacelli | 340/331 |
| 5,621,387 A | * | 4/1997 | Phillips et al. | 340/545.6 |
| 5,684,467 A | * | 11/1997 | Hur | 340/693.9 |
| 5,773,760 A | | 6/1998 | Stark et al. | 174/66 |
| 5,815,886 A | * | 10/1998 | Nishio et al. | 16/360 |
| 5,835,981 A | * | 11/1998 | Smith | 174/82 |
| 5,895,888 A | * | 4/1999 | Arenas et al. | 174/66 |
| 5,914,665 A | * | 6/1999 | Thorp et al. | 340/691.1 |
| 5,969,627 A | | 10/1999 | Tarlton et al. | 340/693.12 |

OTHER PUBLICATIONS

Wheelock brochure, "Alarm Signals For Industrial Safety and Communication" (10 pages).
American Security Equipment Company brochure FSL1–1–12 & FSL1–1–24 Electronic Sounder/Strobe Combination (2 pages).
American Security Equipment Company "SL–3 Fire alarm Strobe Light" (2 pages).
Gentex brochure "710CS/710LS Single Station 120 VAC Photoelectric Smoke Detector . . . " (2 pages).
Gentex brochure "GX Series" (2 pages).
FCI brochures, Bulletins S–340/0481, S–300/0182 and S–341/0487 (3 pages).
System Sensor brochure "Installation Instructions for Models: MA–12/241 Electronic Sounder , SS–12, SS–24 Electronic Strobe, MA/SS–121, MA/SS–241 Sounder/Strobe Combined" (4 pages) 1990.

\* cited by examiner

*Primary Examiner*—Benjamin C. Lee
(74) *Attorney, Agent, or Firm*—Welsh & Katz, Ltd.

(57) ABSTRACT

A plastic mounting plate closes a electrical box which delivers wires to an alarm unit or emergency light or the like. The alarm unit is mounted to the mounting plate by a snap connection and a tab-in-slot connection, without requiring the use of a tool. The mounting plate is connected to the electrical box by screws which engage threaded holes provided by the electrical box. The mounting plate can be mounted to either a single-wide electrical box or a double-wide (4×4) electrical box and provides corresponding holes for connection to either box. An alternate mounting plate for a single-wide electrical box is also provided.

7 Claims, 4 Drawing Sheets

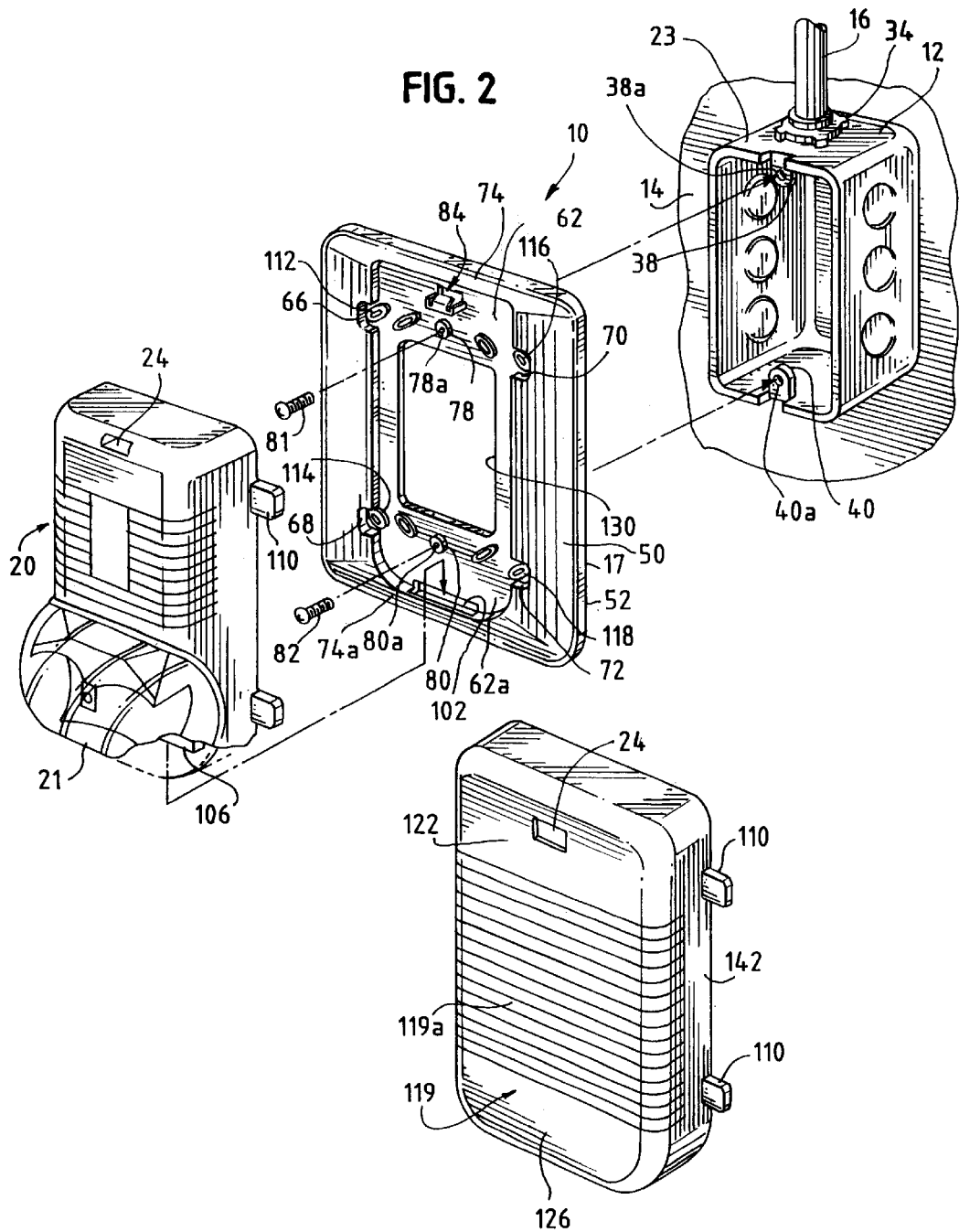

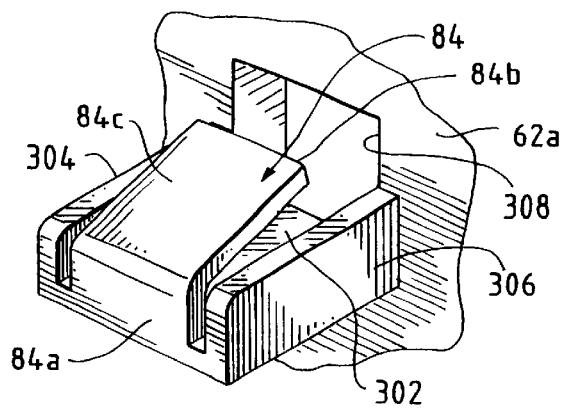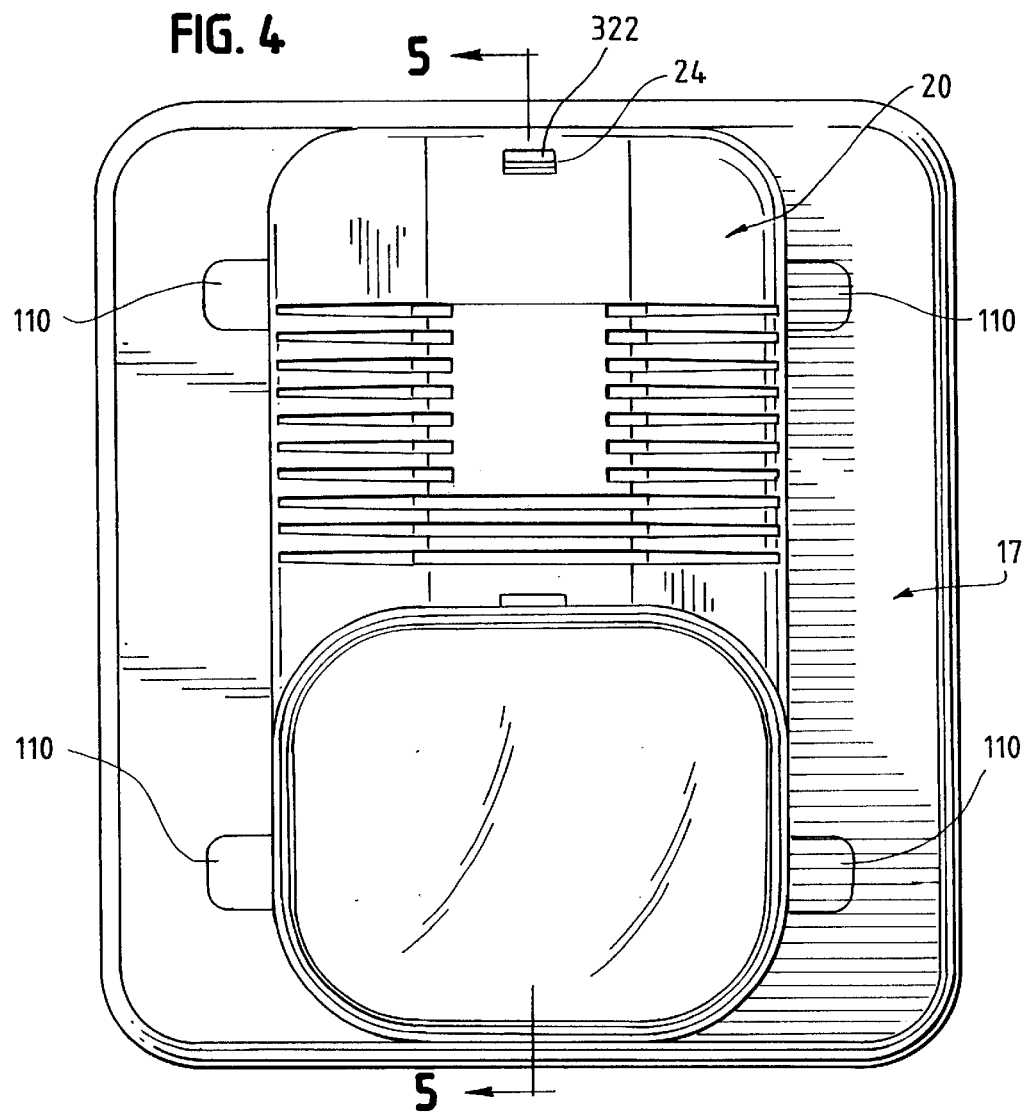

FASTENERLESS CONNECTION FOR OUTPUT DEVICE

This application is a continuation-in-part of U.S. Ser. No. 08/953,122, filed Oct. 17, 1997, now U.S. Pat. No. 6,133,843.

FIELD OF THE INVENTION

The present invention relates to alarm units and associated devices which mount to electrical boxes. More particularly, the present invention relates to a mounting plate for attaching an alarm unit module to either a recessed or a surface mounted electrical box.

BACKGROUND OF THE INVENTION

For purposes of safety and security, alarm or security related electric devices can be positioned throughout a building or structure. The devices can constitute detectors such as smoke detectors, or can be annunciators such as audible fire and security alarms, or can include emergency lights.

The detectors can include motion detectors or other intruder alarms. Additionally, other local area monitoring devices which sense an ambient condition or provide a local alarm can be mounted at locations throughout a building or other structure.

In the case of a building having unfinished walls, such as a warehouse, such devices are typically attached to surface mounted electric wire electrical boxes or junction boxes. These boxes are connected by surface mounted conduits to a central location. The conduits carry signal wires between the central location and the local electrical device, such as the alarm unit or detector.

The alarm units are typically installed by two screws which engage standard screw holes provided on top and bottom sides of the open face of a respective electrical box.

Although such mounting may be adequate to support the alarm unit, it would be desirable to provide a mounting plate which integrates the alarm unit and the respective electrical box into a unitary appearing mounting configuration. It would be desirable to provide a mounting plate which, by its presence on the electrical box, designates the electrical box as being dedicated to a particular safety or security system. It would be desirable to provide a mounting plate which quickly and easily attaches an alarm unit thereto. It would also be desirable to provide a mounting plate which is installable at either a single or double wide (4x4) electrical box without leaving gaps between the mounting plate and the electrical box.

SUMMARY OF THE INVENTION

The mounting plate of the present invention is attachable to a wall recessed electrical box or a surface mounted electrical box. The mounting plate provides an easy mounting arrangement for an alarm unit or module or other electrical device to be attached thereto. The mounting plate and associated alarm units or module include snap engagement parts which allow the alarm unit or module to be attached to the mounting plate without any need for fasteners or tools.

The mounting plate can include a snap lever arrangement for attachment of a compatibly fashioned unit or module which provides a snap stop arranged to engage the snap lever. The mounting plate can also include a slot and the unit or module can include a tab for insertion into the slot, for an additional engagement between the mounting plate and the module or unit.

The arrangement of the invention provides for a quick and easy installation or exchange of an alarm unit, emergency light or other electrical device onto a pre-installed mounting plate.

The mounting plate can be provided in alternate embodiments including a larger version for covering either a single or double wide (4x4) electrical box. A smaller mounting plate is particularly suited for a single wide electrical box. The mounting plates can be significantly oversized when compared to an open face of either electrical box.

When mounted to a recessed electrical box, the electrical box is effectively concealed. Additionally, the screws which connect the mounting plate to the electrical box can be covered by the respective alarm unit, or emergency light, thereby improving the overall appearance of the assembly.

An attachment arrangement incorporating screws or other fasteners is provided for connecting the mounting plate to the standard mounting screw holes available in a electrical box.

The mounting plate is advantageously designed to mount an alarm unit, or other electrical device onto the electrical box and to present a unitary appearance therewith. When so mounted onto a wall recessed electrical box, the electrical box is not visible.

The mounting plate of the present invention is formed as a one-piece, molded plastic structure. The mounting plate can be color coded for type of service, such as a very visible red or yellow fire-alarm color for fire protection or alarm devices. Additionally, different colors can represent different emergency situations. For example, red alarm mounting plates can be allocated for fire alarms, green alarm mounting plates can be allocated for tornado warnings, and blue alarm mounting plates can be allocated for a "take cover immediately" warning. Other colors can be allocated for warning of the presence of excessive concentrations of toxic or explosive gas, or other emergency situations.

The invention also encompasses a mounting plate which can interchangeably receive either an audible alarm unit or an emergency strobe light, or a combination of the two services. Alternate types of modules can also be attached.

In addition to being architecturally appealing, the mounting plate is also functional. When the alarm unit or emergency light is removed from the mounting plate, the mounting plate provides an enclosure and protection to signal wires located within the otherwise open electrical box.

Also, unlike the relatively smaller electrical box, the mounting plate provides a mounting surface which is larger than the alarm unit mounted thereto which provides a stable and secure mounting arrangement. Once installed onto the mounting plate, no portions of the alarm unit overhang the mounting plate. This arrangement avoids an exposed edge vulnerable to prying the alarm unit off the electrical box by vandals.

When installed onto a recessed electrical box the relatively oversized mounting plate covers a greater expanse of wall so that a rougher and larger wall opening around the electrical box can be covered. This is particularly advantageous for retrofitting walls with electrical boxes for alarm service.

While the alarm unit or emergency light is being exchanged, tested, or during construction, the conduit and electrical box is clearly designated as dedicated to signal wires for alarms to reduce any confusion between signal conduits and signal electrical boxes and electrical power conduits and electrical power electrical boxes. In this way, the alarm system components can be more clearly demarcated.

In addition to screws, in an alternate embodiment, the mounting plate can be attached using other types of fasteners. In this regard, snap-fit fasteners can be used.

Other features and advantages of the present invention will become readily apparent from the following detailed description, the accompanying drawings, and the appended claims.

BRIEF DESCRIPTION OF THE DRAWINGS

FIG. 2 is an exploded perspective view of the mounting plate to be assembled on the wall recessed electrical box;

FIG. 3 is a fragmentary perspective view of a portion of the mounting plate shown in FIG. 2;

FIG. 4 is a front elevational view of the mounting plate shown in FIG. 1;

DETAILED DESCRIPTION OF THE PREFERRED EMBODIMENTS

Figure 1:
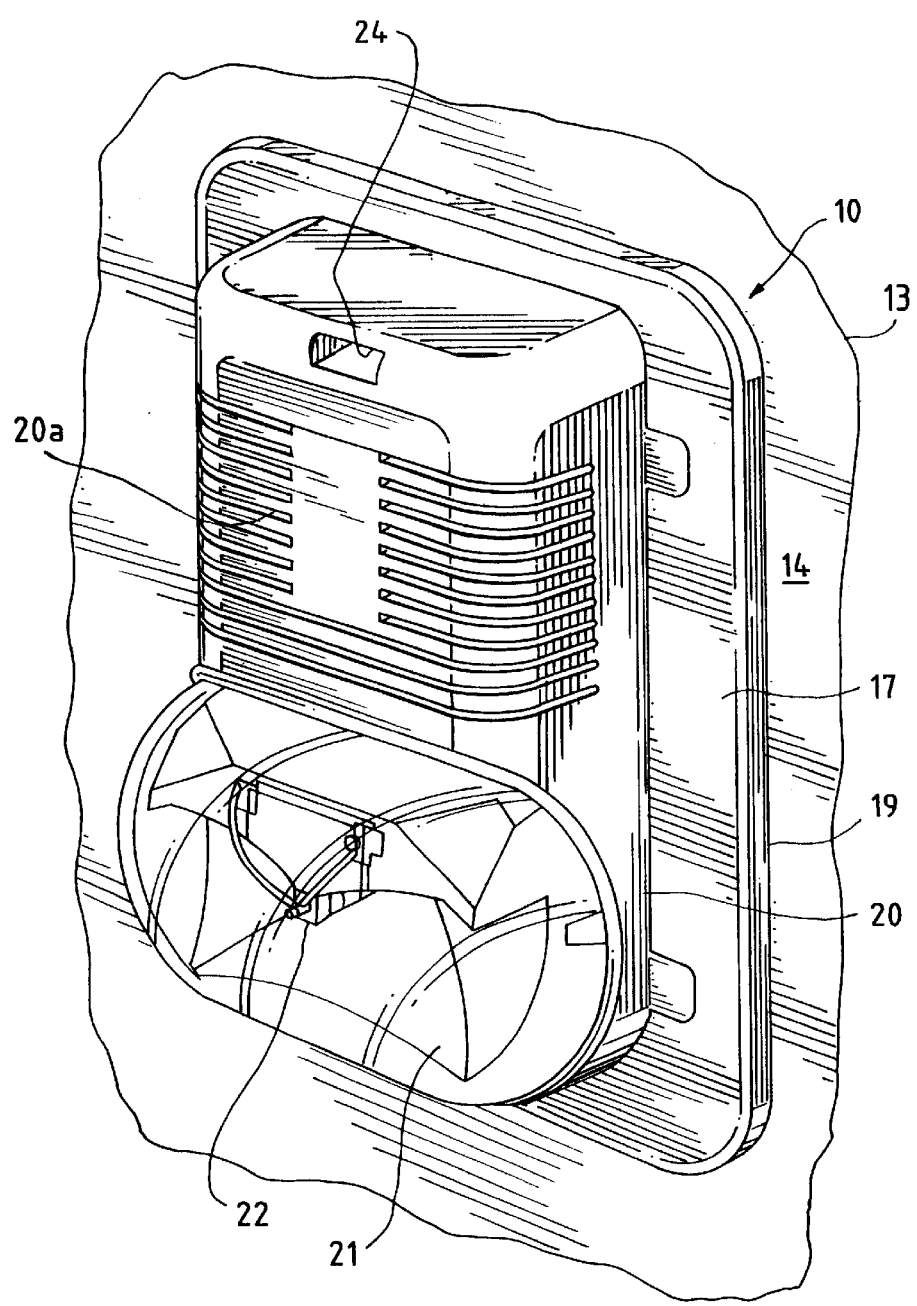
FIG. 1 is a perspective view of a mounting plate installed on a wall recessed electrical box.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

The present invention is an improvement to the mounting plate and module system described in U.S. Ser. No. 08/953,122, filed Oct. 17, 1997 and herein incorporated by reference.

FIG. 1 illustrates an alarm unit assembly 10 installed onto an electrical box 12 (shown in FIG. 2) which is recessed into a wall 13 from a wall surface 14.

A mounting plate 17 is connected to the electrical box. The mounting plate has a surrounding edge 19 which is adjacent to the wall surface 14.

A strobe light alarm unit 20 is mounted to the mounting plate 17. The alarm unit includes a lens 21 covering a lamp 22. In the illustrated embodiment, the strobe light alarm unit also includes an audible alarm 20a, in addition to the strobe light lamp 22, for audible signaling of an alarm condition. The alarm unit 20 includes a disengagement slot 24 used for removal of the unit 20 from the plate 17, as described below.

FIG. 2 illustrates the assembly 10 in an exploded view. The assembly 10 (components of which are described below) is installed over and onto a front face of the wall recessed electrical box 12 which is installed to be recessed from the wall surface 14 (portions of the wall shown broken away). The surface 14 can be on a vertical wall as shown, or on a column, or a ceiling, or on any exposed surface.

The electrical box 12 is connected by at least the one conduit 16 such as being connected to a top panel 23 of the electrical box 12. The conduit 16 carries signal wires into the electrical box.

The conduit 16, as shown, is connected to the top panel 23 by way of a conventional, threaded two-piece conduit connector 34. Also, the box 12 provides bent-tabs 38, 40 which provide threaded screw holes 38a, 40a, therethrough, for receiving screws.

Mounted to and covering an open front face of the electrical box 12 is the mounting plate 17. The mounting plate 17 has a front side 50, and a back side 52. The mounting plate is preferably a one-piece, molded plastic, color coded structure.

The front side 50 includes a recessed central region 62 having four offset, smaller supplemental recesses 66, 68, 70, 72. The recesses 66, 68, 70, 72 are arranged in a rectangular pattern and are open to the recessed region 62. The recesses 66, 68, 70, 72 are arranged recessed into a surrounding rim 74.

Screw supporting cylinders 78, 80 with through-holes 78a, 80a, respectively, are arranged extending through the recessed region 62. The holes 78a, 80a are aligned with the screw holes 38a, 40a of the electrical box 12.

Screws 81, 82 can extend through the holes 78a, 80a which have plain bores. They can be screwed into the screw holes 38a, 40a to mount the mounting plate 17 to the electrical box 12. Other types of fasteners could be used for this purpose. For example, snap-fit fasteners each of which include resilient members such as ridges, or hooks, or ribs, or similar formation, can be inserted into the screw holes 39a, 40a to engage therewith.

A snap lever 84 extends outwardly from within the recessed region 62. The snap lever 84 engages the alarm unit 20, as described below.

The mounting plate 17 further provides a slot 102 formed through the recessed region 62, and also into the rim 74 in a direction generally parallel to a front surface 62a of the recessed region 62. The slot 102 receives a tab 106 of the strobe light unit 20. A front portion 74a of the rim 74 thus retains the tab 106 from frontward movement. The strobe light unit 20 can be easily and quickly installed to the mounting plate by sliding the tab 106 into the slot 102 at a slight angle, pivoting the unit 20 toward the mounting plate, and engaging the snap lever 84 to the unit 20 as described below.

The unit 20 further provides extending tab portions 110 which are arranged to inter-fit into the smaller recesses 66, 68, 70, 72 to cover oblong screw-receiving bores 112, 114, 116, 118. These bores provide an alternate means of mounting the mounting plate to a 4×4 electrical box.

The mounting plate 17 provides a convenient mounting for a plurality of different types of alarm units. FIG. 2 also illustrates an audible alarm unit 119 which is mounted in an identical fashion. The alarm unit 119 includes a horn or audible signal generator 119a within the unit 119.

Either of the alarm units 20, 119, can be attached by using the tab-in-slot and snap connection components.

The mounting plate 17 further includes a central opening 130 through the recessed region 62 which allows the connection of wires from the unit 20, or the unit 119, to wires within the electrical box 12 from the conduit 16. The opening 130 can be made smaller than an open face of the electrical box, so that if a unit 20, 119 is removed from the mounting plate, loose wires can be retained within the electrical box by the mounting plate.

FIG. 3 illustrates the snap lever 84 and associated structure in more detail. The snap lever 84 is a substantially L shaped member. The snap lever 84 extends from a base end 84a to a free end 84b, toward the front surface 62a of the recessed region 62.

The base end 84a is formed onto a rectangular base member 302 that extends perpendicularly from the surface 62a. Lateral wall members 304, 306 extend perpendicularly from both the base member 302 and the surface 62a and stiffen the base member 302.

The surface 62a includes a rectangular opening 308 which is present to allow injection molding of the snap lever 84 unitarily with the recessed region 62 in a simple two-piece separable mold. A substantially horizontal leg 84c of the snap lever 84 is angled upwardly toward the surface 62a.

FIG. 4 illustrates the alarm unit 20 and the disengagement slot 24. The slot 24 is sized to receive a screw driver blade to disengage the snap lever 84 from the unit 20.

Figure 5:
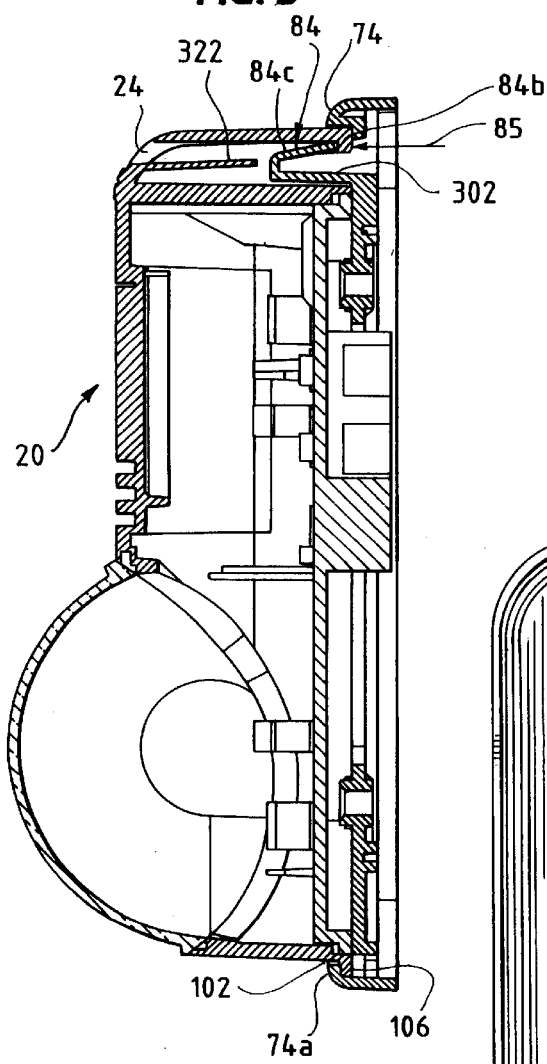
FIG. 5 is a sectional view taken generally along lines 5—5 of FIG. 4.

FIG. 5 illustrates the unit 20 includes a snap stop 85 which engages the distal end 84b of the snap lever 84. A guiding wall 322 is adjacent the slot 24. For disengaging the unit 20 from the plate 17, the guiding wall 322 acts to guide the screw driver blade onto a top surface of the leg 84c of the snap lever 84, to depress downwardly the leg 84c to disengage the free end 84b from the snap stop 85. The snap stop 85 is a short, inwardly directed vertical wall portion of top wall 20b of the alarm unit 20.

The attachment components of the alarm unit 119 (shown in FIG. 2) to the plate 17 are identical to those of the alarm unit 20, and need not be described in detail.

Figure 6:
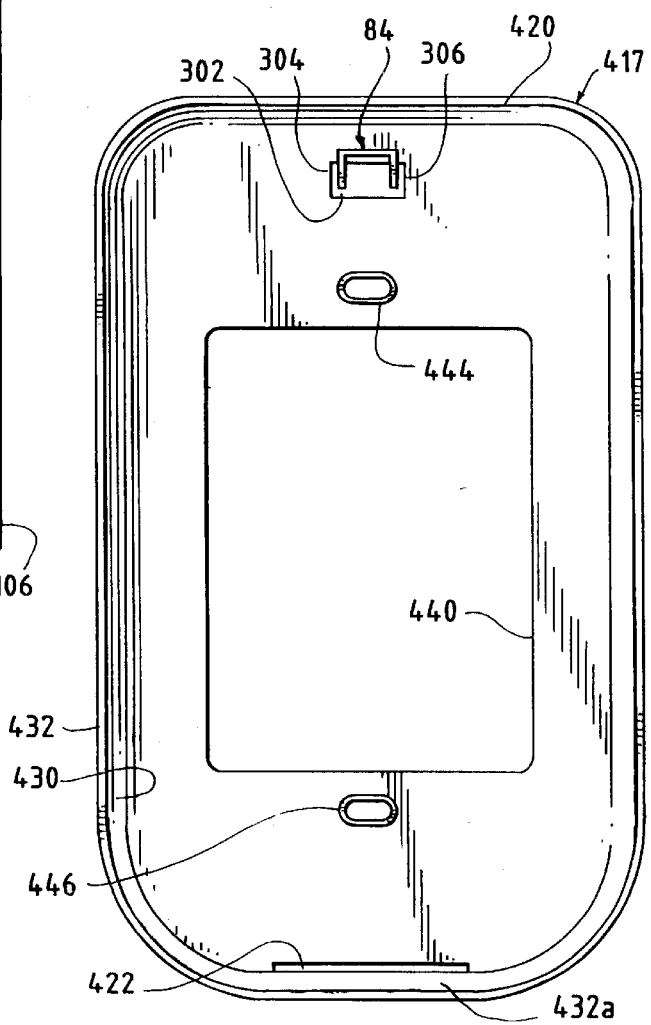
FIG. 6 is a front elevational view of an alternate mounting plate.

FIG. 6 illustrates an alternate mounting plate 417 of the present invention. This mounting plate 417 is particularly suited for a single-wide electrical box and includes the snap lever 84 and associated structure as previously described, for holding the electronic unit, such as a strobe light 20 or the audible alarm 119, to the plate 417.

A slot 422 arranged on the bottom end of the plate 417 receives a tab 106 of the electronic unit as previously described. The plate 417 includes a recessed region 430 for slidingly receiving an alarm unit. The recessed region 430 is surrounded by a rim 432.

Located in a central region of the recessed region 430 is an aperture 440 for passing wires between the mounted electronic unit 20, 199 and the electrical box. Located between the screw-receiving cylinder 420 and the slot 422 are oval cylinders 444, 446.

The cylinders 444, 446 each receive a screw which connects to the fixture-receiving holes of the electrical box, such as 38a, 40a, as shown in FIG. 2. The oval shape of the cylinders 444, 446 allows for some adjustment of verticality of the mounting plate 417 with respect to the electrical box, particularly for aesthetic appearance. The sectional views of the plate 417 are as described in U.S. Ser. No. 08/953,122, except as modified by the above description.

The alternate embodiment of FIG. 6 can be used with the alarm units as shown in FIG. 2, the strobe light 20 and the audible alarm 119. For use with these alarms, the tabs 110 on the alarm units can be broken off easily, as described in U.S. Ser. No. 08/953,122. The alarm units thus modified have a rounded rectangular profile to fit snugly within the recessed area 430.

The present invention provides a system of attaching alarm units 20, 119 to mounting plates such as plates 17, 417 that requires no tools for attachment and only requires a screw driver for detachment of the alarm units from the plates. The system allows alarm units to be quickly and securely installed onto mounting plates. The system provides for a lower parts and manufacturing cost by eliminating metallic fasteners, as well as a lower installation cost by reducing the time required to install each unit to its mounting plate.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. An assembly for an electrical box, the electrical box, the plate having first and second spaced apart sides with at least one opening for connection to the box extending therethrough wherein the first side is oriented toward the box, when the plate is being connected to the box, and the second side is oriented outwardly, away from the box, wherein the plate carries on the second side, at least a first, slidable engagement member; and an alarm unit which has a mounting side which carries a second, slidable engagement member fixedly attached thereto wherein the two engagement members slidably engage one another thereby locking the alarm unit to the mounting plate, precluding rotation of the alarm uniot6, with the second side of the plate located adjacent to the mounting side of the unit.

2. An assembly as in clam 1 wherein the engagement members slidably engage with a snap fit.

3. An assembly as in claim 1 wherein the plate carries one of a slot and a protrusion o the second side and the alarm unit carries a mating one of a protrusion and a slot whereby a respective slot and protrusion engage as the two engagement members slidably engage.

4. An assembly as in claim 1 wherein the plate defines at least a second opening for receipt of at least one conductor for the alarm unit.

5. An assembly as in claim 1 wherein the alarm unit defines an entry port for decoupling the engagement members.

6. An assembly as in claim 1 wherein the alarm unit includes a decoupling structure for releasing the cou0pled engagement members from one another.

7. An assembly as in claim 6 wherein the alarm unit includes a decoupling structure for releasing the coupled engagement members from one another.

* * * * *